(12) United States Patent
Jeon et al.

(10) Patent No.: US 9,781,777 B2
(45) Date of Patent: Oct. 3, 2017

(54) TRAY FOR MICROWAVE OVEN

(75) Inventors: Ki Suk Jeon, Seongnam-si (KR); Jong Chull Shon, Suwon-si (KR); Min Gyu Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 793 days.

(21) Appl. No.: 13/525,672

(22) Filed: Jun. 18, 2012

(65) Prior Publication Data
US 2012/0325807 A1 Dec. 27, 2012

(30) Foreign Application Priority Data

Jun. 24, 2011 (KR) ........................ 10-2011-0061500

(51) Int. Cl.
*H05B 6/80* (2006.01)
*H05B 6/64* (2006.01)
*A47J 36/02* (2006.01)

(52) U.S. Cl.
CPC .......... *H05B 6/6408* (2013.01); *A47J 36/027* (2013.01); *H05B 6/6494* (2013.01)

(58) Field of Classification Search
CPC ............... H05B 6/6408; H05B 6/6494
USPC ....... 219/728, 729, 730, 732, 762, 725, 733, 219/734, 735
See application file for complete search history.

(56) References Cited

U.S. PATENT DOCUMENTS

| | | | |
|---|---|---|---|
| 3,965,323 A | 6/1976 | Forker, Jr. et al. | |
| 4,800,247 A | 1/1989 | Schneider et al. | |
| 4,830,894 A | 5/1989 | Roche et al. | |
| 5,038,009 A | 8/1991 | Babbitt | |
| 5,094,865 A | 3/1992 | Levinson | |
| 5,188,089 A * | 2/1993 | Hamilton | ........................ 126/30 |
| 5,387,781 A | 2/1995 | Berkoff | |
| 5,508,498 A * | 4/1996 | Rheinish | ................ A47G 21/02 |
| | | | 219/730 |
| 5,558,798 A * | 9/1996 | Tsai | .............................. 219/731 |
| 6,677,563 B2 * | 1/2004 | Lai | ................................ 219/728 |
| 2006/0000828 A1 | 1/2006 | Watkins | |
| 2009/0246332 A1 | 10/2009 | Lai et al. | |
| 2010/0230403 A1 | 9/2010 | Hodson et al. | |

FOREIGN PATENT DOCUMENTS

| | | |
|---|---|---|
| CN | 101392921 A | 3/2009 |
| CN | 201547859 | 8/2010 |
| EP | 1 348 365 A1 | 10/2003 |
| EP | 1 553 805 A2 | 7/2005 |
| EP | 1 553 805 A3 | 7/2005 |

(Continued)

OTHER PUBLICATIONS

European Search Report dated May 9, 2014 in European Patent Application No. 12172635.0.

(Continued)

*Primary Examiner* — Phuong Nguyen
(74) *Attorney, Agent, or Firm* — Staas & Halsey LLP

(57) ABSTRACT

A tray for a microwave oven and a microwave oven having the same is disclosed. Heat generators are formed on the surface of a tray unit of the tray for a microwave oven through transfer coating carried out at a high temperature, and thus the tray for a microwave oven may be heated to a high temperature, thereby being capable of effectively forming a grill mark on food to be cooked.

10 Claims, 6 Drawing Sheets

(56) References Cited

FOREIGN PATENT DOCUMENTS

| GB | 2 439 520 A | 1/2008 |
|----|-------------|--------|
| KR | 10-2003-0014179 | 2/2003 |
| KR | 10-2005-0073146 | 7/2005 |
| KR | 10-2007-0062805 | 6/2007 |
| KR | 10-2010-0029792 | 3/2010 |
| KR | 10-2010-0109119 | 10/2010 |

OTHER PUBLICATIONS

Chinese Office Action issued Nov. 30, 2016 in corresponding Chinese Patent Application No. 201210213473.0, 6 pages.
European Search Report dated Feb. 13, 2017 in corresponding European Patent Application No. 16192487.3, 9 pages.
Chinese Office Action dated Mar. 30, 2017 in related Chinese Application No. 201210213473.0.
Extended European Search Report dated Jun. 19, 2017 in related European Application No. 16192487.3.

* cited by examiner

TRAY FOR MICROWAVE OVEN

CROSS-REFERENCE TO RELATED APPLICATIONS

This application claims the priority benefit of Korean Patent Application No. 10-2011-0061500, filed on Jun. 24, 2011 in the Korean Intellectual Property Office, the disclosure of which is incorporated herein by reference.

BACKGROUND

1. Field

Embodiments relate to a tray for a microwave oven which receives high frequencies to generate heat and a microwave oven having the same.

2. Description of the Related Art

In general, a microwave oven is an apparatus which radiates high frequencies to the inside of a cooking chamber and causes rotation and vibration of water molecules within food using the high frequencies to cook the food using frictional heat between the water molecules.

Since heating using the microwave oven causes dryness due to evaporation of moisture and does not cause browning, a tray for a microwave oven and an electric heater for grills are used in order solve such problems.

A tray for a microwave oven includes a heat generator to absorb high frequencies to generate heat, and is generally manufactured by attaching rubber ferrite to the bottom surface of a tray made of a metal. Rubber ferrite is formed by mixing ferrite powder absorbing high frequencies to generate heat with an organic material, such as rubber. Rubber ferrite is molded to have a shape corresponding to the lower surface of a tray for a microwave oven, and is then attached to the lower surface of the tray for a microwave oven, thereby being used as a heat generator to heat the tray for a microwave oven.

Since the above-described conventional heat generator used in the tray for microwave oven includes rubber, if the tray for microwave oven is heated to a high temperature of 200° C. or more, the conventional heat generator may easily melt or be damaged. Therefore, if the tray for microwave oven is formed of rubber ferrite is used, the microwave oven is heated such that the temperature of the tray for a microwave oven is kept less than 200° C. However, it may be difficult to form a grill mark on food through grilling at such a temperature.

SUMMARY

In an aspect of one or more embodiments, there is provided a tray for a microwave oven which may grill food.

In accordance with an aspect of one or more embodiments, there is provided a tray for a microwave oven, which includes a tray unit to receive food, and heat generators formed of a material absorbing high frequencies to generate heat and formed on the surface of the tray unit, wherein the heat generators are formed on the surface of the tray unit through transfer coating.

The tray unit may be formed of ceramic.

The heat generators may be formed of at least one of carbon, graphite and ferrite.

The tray for a microwave oven may further include a first heat generating part in which the heat generators are distributed at the center of the lower surface of the tray unit, and a second heat generating part in which the heat generators having a higher distribution than the first heat generating part are distributed at the outside of the first heat generating part.

The tray for the microwave oven may further include a first heat generating part in which the heat generators are distributed at the center of the lower surface of the tray unit, a second heat generating part in which the heat generators having a lower distribution than the first heat generating part are distributed at the outside of the first heat generating part, and a third heat generating part in which the heat generators having a higher distribution than the second heat generating part are distributed at the outside of the second heat generating part.

The upper surface of the tray unit may include a cooking unit provided to cook food, and the cooking unit may include at least one of a first cooking part concaved to execute frying, and a second cooking part provided with grill markers to execute grilling.

The upper surface of the tray unit may further include a fluid accommodation groove concaved at the edge of the cooking unit to accommodate a fluid.

In accordance with an aspect of one or more embodiments, there is provided a microwave oven which includes a main body provided with a cooking chamber, and a tray for the microwave oven inserted into the cooking chamber, wherein the tray for a microwave oven includes a tray unit to receive food and heat generators formed of a material absorbing high frequencies to generate heat and formed on a surface of the tray unit, and the heat generators are formed on the surface of the tray unit through transfer coating.

The microwave oven may further include a tray support on which the tray for a microwave oven is mounted, and the tray support may include a support part to support the edge of the tray for a microwave oven, a plurality of legs extending downward from the support part, and a pair of support grips extending from the support part in the centrifugal direction.

The tray support may be formed of a metal wire.

The microwave oven may further include a tray cover for a microwave oven to cover the upper portion of the tray for the microwave oven.

In accordance with an aspect of one or more embodiments, there is provided a control method of a microwave oven which includes preheating a tray for a microwave oven when a preheating command is input, and stopping preheating of the tray for the microwave oven so as to place food on the tray for the microwave oven, after preheating of the tray for the microwave oven.

The control method may further include heating the tray for a microwave oven and the food on the tray for the microwave oven, when a cooking command is input after stoppage of preheating of the tray for the microwave oven.

The control method may further include stopping heating of the tray for a microwave oven and the food on the tray for the microwave oven to discharge the tray for a microwave oven from the microwave oven, after heating of the tray for a microwave oven and the food on the tray for the microwave oven.

The control method may further include stopping heating of the tray for the microwave oven and the food on the tray for the microwave oven to turn the food over, after heating of the tray for the microwave oven and the food on the tray for the microwave oven.

The control method may further include heating the tray for the microwave oven and the turned-over food thereon, when the cooking command is again input after stoppage of heating of the tray for the microwave oven, and stopping heating of the tray for microwave oven and the turned-over food thereon to discharge the tray for a microwave oven from the microwave oven, after heating of the tray for the microwave oven and the turned-over food thereon.

In accordance with an aspect of one or more embodiments, there is provided a manufacturing method of a tray for a microwave oven which includes printing a film with powder of a material absorbing electromagnetic waves to generate heat in a designated pattern, attaching the film to the tray for the microwave oven, and heating the tray for the microwave oven to which the film is attached to a high temperature to form heat generators arranged in the designated pattern through combustion of the film.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Figure 1:
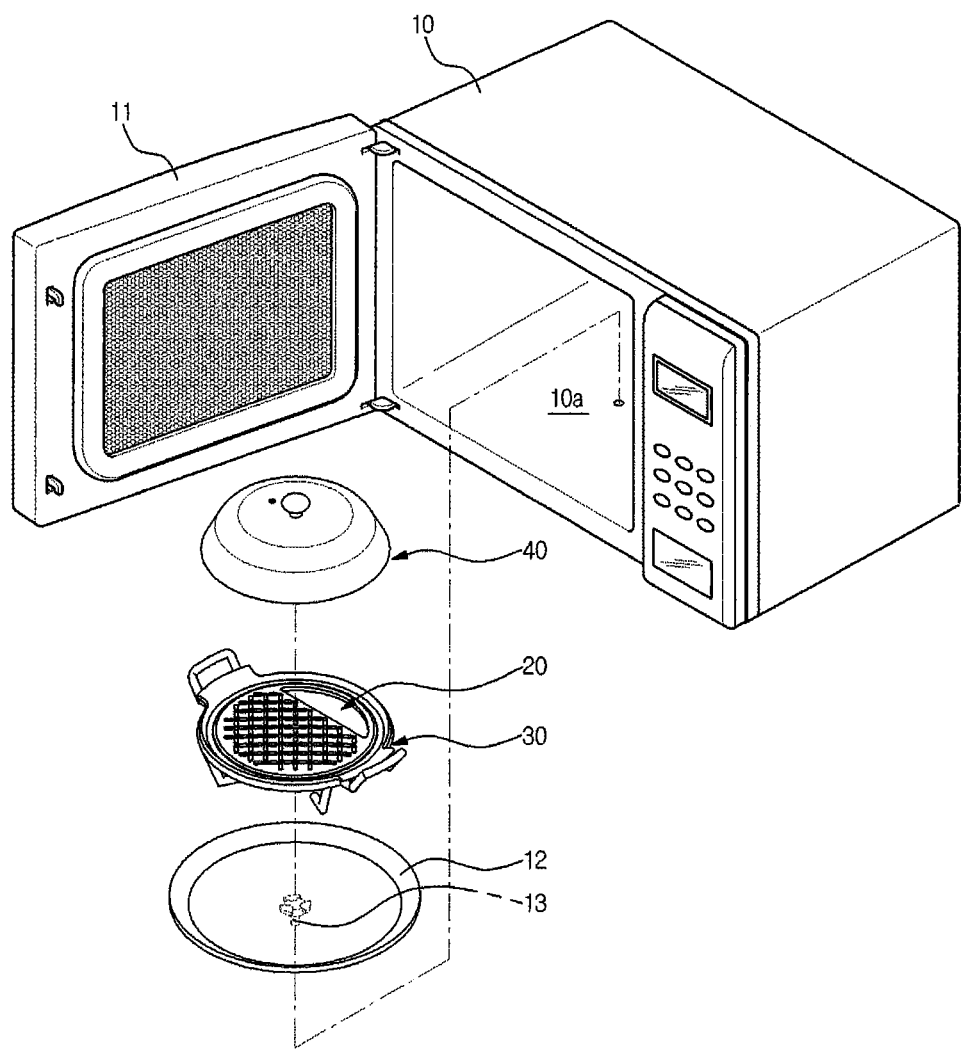
FIG. 1 is a perspective view illustrating a tray for a microwave oven and a microwave oven having the same in accordance with an embodiment.
Figure 2:
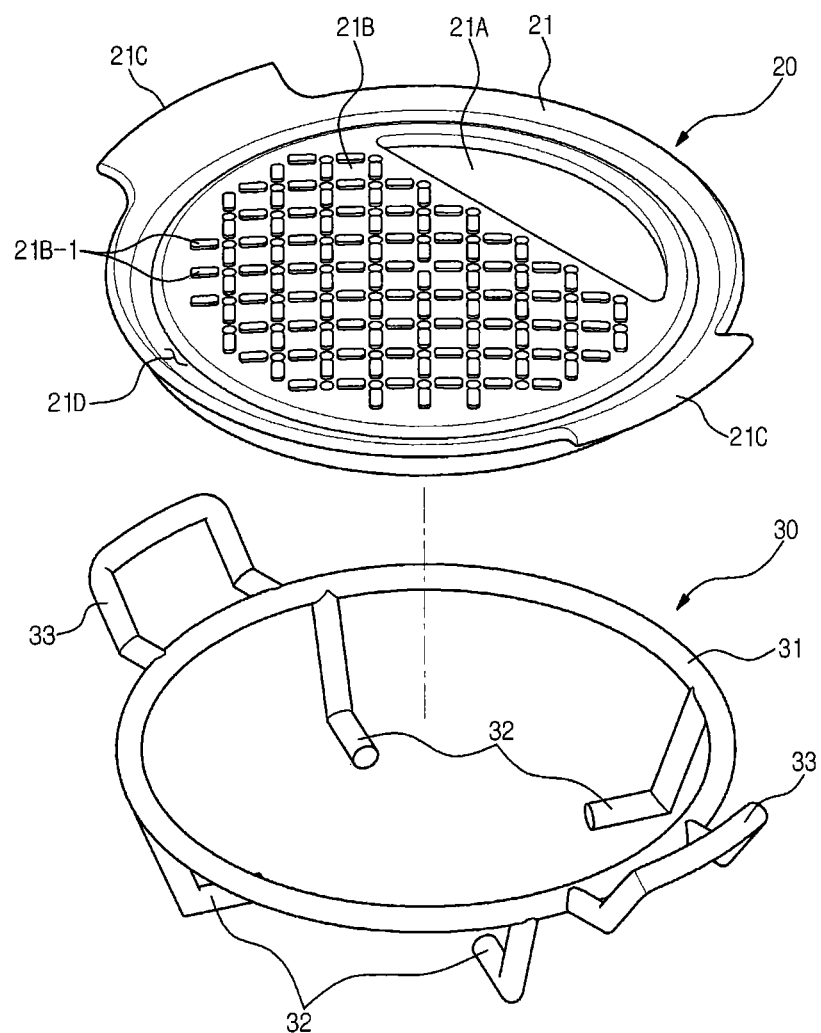
FIG. 2 is a perspective view illustrating a tray for a microwave oven and a tray support in accordance with an embodiment.

Reference will now be made in detail to embodiments which are illustrated in the accompanying drawings, wherein like reference numerals refer to like elements throughout.

Hereinafter, a tray for a microwave oven in accordance with an embodiment will be described in detail with reference to the accompanying drawings.

As shown in FIG. 1, a microwave oven to which the tray for a microwave oven in accordance with an embodiment is applied includes a main body 10 forming the external appearance of the microwave oven and provided with a cooking chamber 10a formed therein, a door 11 rotatably installed at one side of the main body 10 to open and close the cooking chamber 10a, a magnetron (not shown) provided within the main body 10 to emit high frequencies to the cooking chamber 10a, and a controller provided within the main body 10 to control operation of the microwave oven.

Further, a rotary shelf 12 rotated to uniformly cook food mounted thereon is arranged within the cooking chamber 10a. A rotary shelf 12 is mounted on a coupler 13, which is connected to a drive device (not shown), such as a motor, etc. The coupler 13 is rotated by the drive device to rotate the rotary shelf 12. The coupler 13 is connected to the center of the lower surface of the rotary shelf 12.

A tray 20 for a microwave oven is arranged within the cooking chamber 10a, and is heated by the high frequencies emitted from the magnetron of the microwave oven to cook food through a grilling method. The tray 20 for a microwave oven includes a tray unit 21 containing food, and heat generators 22 (with reference to FIGS. 3 and 4) formed on the lower surface of the tray unit 21 and absorbing the high frequencies emitted from the magnetron to generate heat.

In this embodiment, the tray unit 21 is formed of a material having high heat resistance and high specific heat, i.e., ceramic, and is formed in a circular dish shape. The tray unit 21 is divided into a first cooking part 21A to cook food not requiring a grill mark, such as fried eggs or roasted food, and a second cooking part 21B provided with a plurality of grill markers 21B-1 to cook food requiring a grill mark, such as a steak. Therefore, the tray 20 for a microwave oven may simultaneously cook food not requiring a grill mark and food requiring a grill mark through the first cooking part 21A and the second cooking part 21B.

In an embodiment, the upper surface of the tray unit 21 which food directly contacts. i.e., the cooking parts 21A and 21B, is coated with a non-stick material, thereby preventing food from sticking to the cooking parts 21A and 21B and allowing the cooking part 21A and 21B to be easily cleaned after cooking has been completed.

Tray grips 21C allowing a user to easily grasp the tray 20 for a microwave oven are integrally formed at both sides of the tray unit 21. The tray grips 21C extend sideward from both sides of the tray unit 21 and are separated from the heat generators 22 as compared with the cooking parts 21A and 21B, so as to maintain a lower temperature than the cooking parts 21A and 21B.

Further, a fluid accommodation groove 21D to accommodate a fluid is provided at the edge of the upper surface of the tray 21. The fluid accommodation groove 21D is formed in a ring shaped at the outside of the first cooking part 21A and the second cooking part 21B. The fluid accommodation groove 21D serves to accommodate moisture or oil from food when the food is grilled, and serves to contain water to be evaporated into steam when food is steamed.

The heat generators 22 are formed of a material absorbing high frequencies to generate heat, i.e., carbon, graphite, ferrite, etc.

Since the heat generators 22 are formed on the lower surface of the tray unit 21, as described above, the tray 20 for a microwave oven may be separated from the rotary shelf 12 by a designated distance or more in order to allow the high frequencies to easily reach the heat generators 22.

Therefore, a microwave oven may include a tray support 30 on which the tray 20 for a microwave oven is mounted. The tray support 30 is formed of a metal wire.

Such a tray support 30 includes a support part 31 formed in a ring shape to support the edge of the tray 20 for a microwave oven, a plurality of legs 32 extending downward from the support part 31 to separate the lower surface of the tray 20 for a microwave oven from the rotary shelf 12, and a pair of support grips 33 extending sideward from both sides of the support part 31 to allow a user to easily grasp the tray support 30.

Further, the microwave oven may include a tray cover 40 to cover the tray 20 for a microwave oven, as shown in FIG. 1. The tray cover 40 is used when the tray 20 for a microwave oven is used for steaming, and enables steam generated through evaporation of water contained in the fluid accommodation groove 21D to be transmitted to food and thus to be used in steaming.

The above-described heat generators 22 are formed on the lower surface of the tray unit 21 through transfer coating.

Transfer coating is a method which is widely used to decorate a ceramic container, such as pottery or a cup, with a pattern.

In an embodiment, a process of forming the heat generators 22 on the tray 20 for a microwave oven through transfer coating will be described below.

Powder of an inorganic material absorbing electromagnetic waves to generate heat, such as carbon, graphite, ferrite, etc., is printed onto a film to form a designated pattern, the film is attached to the tray 20 for a microwave oven formed of ceramic, the tray 20 for a microwave oven to which the film is attached is heated to a high temperature so that the film formed of the organic material is eliminated through combustion using heat and only the inorganic material, such as carbon, graphite, ferrite, etc., remains on the surface of the tray 20 for the microwave oven to form the heat generators 22. The heat generators 22 formed through such a method maintain the pattern in which the inorganic material is printed on the film, and thus are formed on the tray 20 for a microwave oven in the designated pattern.

When the heat generators 22 are formed in such a manner, the heat generators 22 are integrated with the tray unit 21 formed of ceramic, thus having excellent abrasion resistance and heat resistance and a thin thickness. Therefore, the tray 20 for microwave oven may be heated to a temperature required to form a grill mark, i.e., 300° C. or more, through the microwave oven, and may thus grill food and have a thin thickness.

Further, since transfer coating goes through the process of printing a film with a material, such as carbon, graphite, ferrite, etc., using a carrier containing silicon, as described above, the heat generators 22 may be randomly formed in various shapes and distributions through such a process. Therefore, a designer may freely design the shape and distribution of the heat generators 22 of the tray 20 for a microwave oven according to characteristics of the corresponding microwave oven.

The inside of the cooking chamber 10a of the microwave oven may have a distribution of different high frequencies in respective areas according to various variables, such as the size and shape of the cooking chamber 10a or the capacity of the magnetron. When the tray 20 for a microwave oven is arranged in the cooking chamber 10a, amounts of high frequencies transmitted to respective areas of the tray 20 for a microwave oven may be different.

Therefore, the pattern of the heat generators 22 formed on the tray 20 for a microwave oven may be changed according to the amounts of the transmitted high frequencies, thereby allowing the tray 20 for a microwave oven to be heated with a uniform temperature distribution, or to be heated such that a specific area of the tray 20 for microwave oven has a high temperature or a low temperature.

Figure 3:
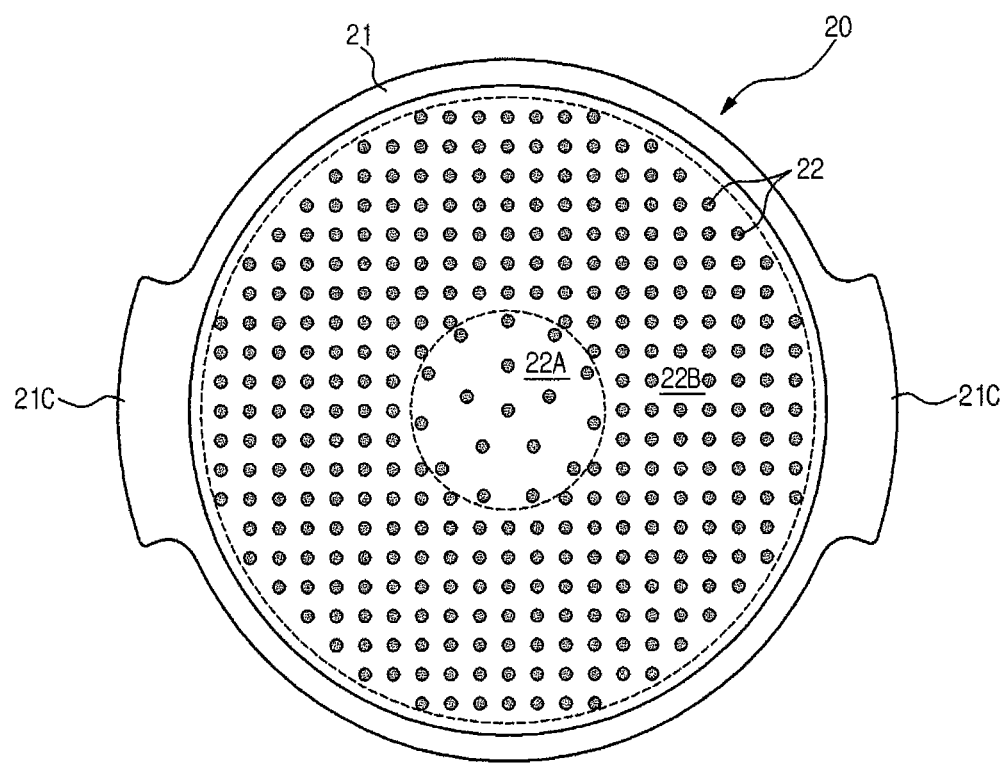
FIG. 3 is a bottom view illustrating an example of distribution of heat generators applied to a tray for a microwave oven in accordance with an embodiment.

FIG. 3 illustrates one example of distribution of the heat generators 22 manufactured through transfer coating.

As shown in FIG. 3, the heat generators 22 are formed on the lower surface of the tray unit 21. A first heat generating part 22A having a relatively low distribution of the heat generators 22 is formed at the center of the lower surface of the tray unit 21. A second heat generating part 22B in which the heat generators 22 are provided at a higher distribution than the first heat generating part 22A is formed in a ring shape at the outside of the first heat generating part 22A.

When the heat generators 22 of the first heat generating part 22A is arranged at a relatively low distribution as compared to the second heat generating part 22B, as described above, the central region of the tray unit 21 heated by the first heating part 22A maintains a relatively lower temperature than the region heated by the second heating part 22B. The tray 20 for a microwave oven provided with the heat generating parts 22A and 22B may be applied to a microwave oven provided with the coupler 13 formed of a resin with poor heat resistance, thereby preventing damage to the coupler 13 due to heat.

Figure 4:
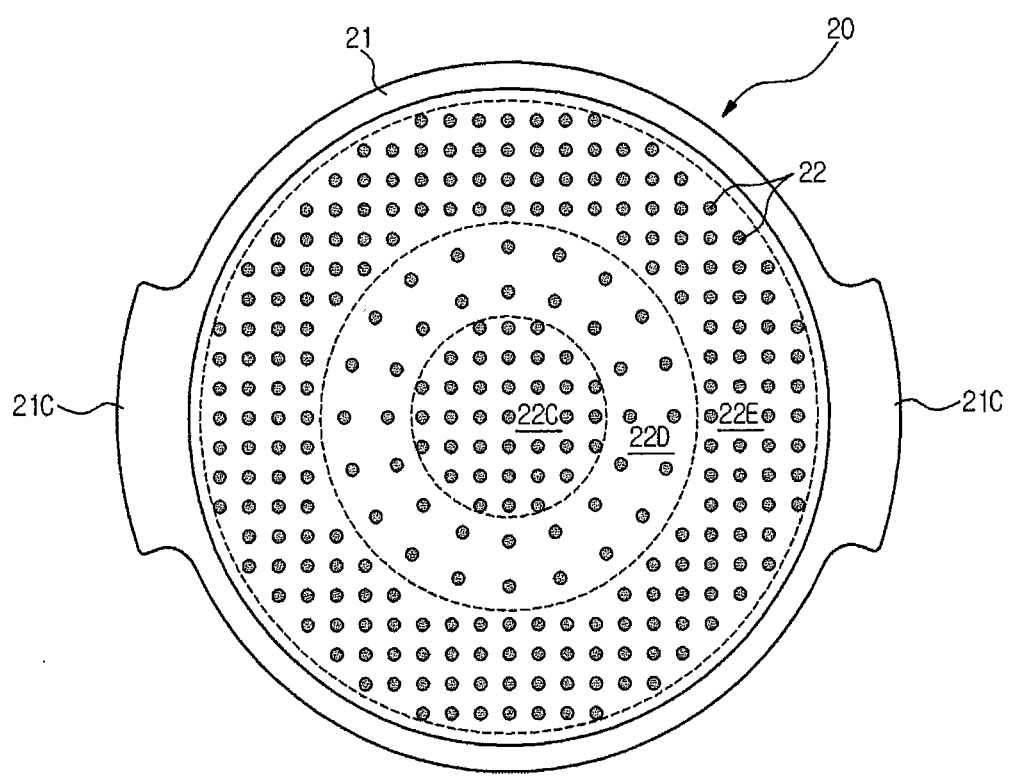
FIG. 4 is a bottom view illustrating an example of distribution of heat generators applied to a tray for microwave oven in accordance with an embodiment.
Figure 5:
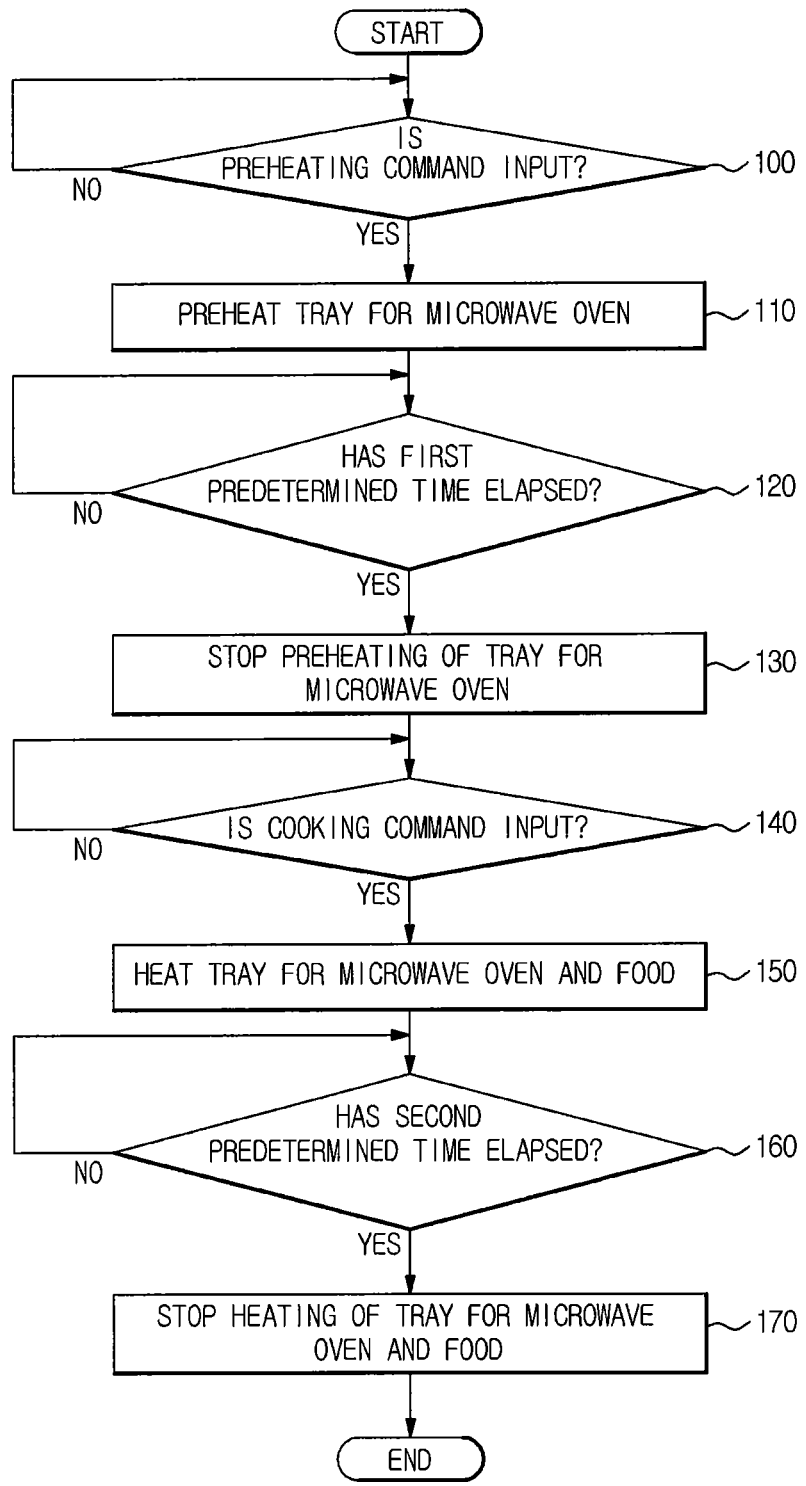
FIG. 5 is a flowchart illustrating a control method of a microwave oven in accordance with an embodiment.

Further, FIG. 4 illustrates another example of distribution of the heat generators 22 manufactured through transfer coating.

As shown in FIG. 4, the heat generators 22 are formed on the lower surface of the tray unit 21. A first heat generating part 22C having a relatively low distribution of the heat generators 22 is formed at the center of the lower surface of the tray unit 21. A second heat generating part 22D in which the heat generators 22 are provided at a lower distribution than the first heat generating part 22C is formed in a ring shape at the outside of the first heat generating part 22C. A third heat generating part 22E in which the heat generators 22 are provided at a higher distribution than the second heat generating part 22D is formed in a ring shape at the outside of the second heat generating part 22D.

By applying the tray 20 for a microwave oven provided with the heat generating parts 22C, 22D and 22E to a microwave oven designed such that a relatively large amount of high frequencies are transmitted to a position corresponding to the second heating part 22D, the tray unit 21 of the tray 20 for a microwave oven may be uniformly heated.

Hereinafter, a cooking method using the microwave oven provided with a tray 20 for a microwave oven in accordance with an embodiment will be described.

First, food is placed on the tray unit 21 of the tray 20 for a microwave oven, and then the tray 20 for a microwave oven on which the food is placed is arranged within the cooking chamber 10a. When the microwave oven is operated in such a state, a part of high frequencies generated from the magnetron are transmitted to the food and are used to cook both the inside and the outside of the food.

Most of the high frequencies except for the part of the high frequencies transmitted to the food are absorbed by the heat generators 22, and then the heat generators 22 generate heat. The tray 20 for a microwave oven simultaneously induces browning of the food and is heated to a temperature of easily forming a grill mark, i.e., 300° C. or more, due to the heat generated by the heat generators 22.

Therefore, one surface of the food contacting the tray 20 for a microwave oven is directly heated by the heat generated from the tray 20 for a microwave oven as well as the high frequencies, thus being more rapidly cooked than the other surface of the food. Accordingly, one surface of the food may be more rapidly cooked than the inside of the food through the tray 20 for a microwave oven.

Further, since the tray 20 for a microwave oven may be heated to a temperature inducing browning of the food, i.e., 300° C. or more, when the tray 20 for microwave oven is heated to the temperature of 300° C. or more through the microwave oven, one surface of the food contacting the tray 20 for a microwave oven is browned. Particularly, regions of the food contacting the grill markers 21B-1 of the tray unit 21 are rapidly browned, and thus a grill mark in a shape corresponding to the grill markers 21B-1 is formed on the food.

Further, the tray 20 for a microwave oven in accordance with an embodiment may go through a preheating process through the microwave oven so that a difference of cooked degrees between the surface and the inside of the food may increase. That is, if food, such as toast, fried eggs, a steak, etc., is cooked, the tray 20 for the microwave oven is first preheated and then the food is placed on the tray 20 for a microwave oven, thereby allowing one surface of the food contacting the tray 20 for a microwave oven to be cooked crisply and the remainder of the food to maintain a relatively smooth state.

In the case of toast, after the tray 20 for a microwave oven has been preheated to a temperature of 200° C., a slice of bread may be placed on the tray 20 for a microwave oven, and in the case of fried eggs, after the tray 20 for the microwave oven has been preheated to a temperature of 250° C., eggs may be placed on the tray 20 for a microwave oven. Further, in the case of a steak, the steak may be cooked by preheating the tray 20 for a microwave oven to a temperature in the range of 300-500° C. according to a desired cooked degree, such as rare, medium, well-done, etc.

Hereinafter, grilling of food, such as a steak, as described above, will be described.

First, only after the tray 20 for a microwave oven has been put into the cooking chamber 10*a* of the microwave oven, the tray 20 for a microwave oven is preheated to a predetermined temperature by operating the microwave oven for a designated time.

When food is placed on the preheated tray 20 for a microwave oven, one surface of the food contacting the tray 20 for a microwave oven is heated and cooked by the preheated tray 20 for a microwave oven.

When the tray 20 for a microwave oven on which the food is placed is again put into the cooking chamber 10*a* in the above state and then the microwave oven is operated, the entirety of the food is heated by high frequencies and the tray 20 for a microwave oven is heated by the heat generators 22 generating heat by received high frequencies. Therefore, one surface of the food contacting the tray 20 for a microwave oven is heated by both the high frequencies and the heat transmitted from the tray 20 for a microwave oven, thus being more rapidly cooked than other portions of the food.

After cooking using the high frequencies has been carried out for a designated time, when the food is turned over and placed on the tray 20 for a microwave oven such that the opposite surface of the food contacts the tray 20 for a microwave oven, the opposite surface of the food is cooked by heat transmitted from the tray 20 for a microwave oven.

In the above state in which the opposite surface of the food contacts the tray 20 for a microwave oven, the opposite surface of the food may be cooked by residual heat remaining in the tray 20 for a microwave oven.

On the other hand, after the food has been turned over and placed on the tray 20 for a microwave oven such that the opposite surface of the food contacts the tray 20 for a microwave oven, the tray 20 for a microwave oven may again be put into the cooking chamber 10*a* and then the microwave oven may be operated to cook the food.

After cooking of the food has been completed, the tray 20 for a microwave oven on which the food is placed may be discharged from the cooking chamber 10*a*, and may be placed on a dining table as tableware. Since the tray 20 for a microwave oven is formed of ceramic having high specific heat, as described above, the tray 20 for a microwave oven may heat the food for a designated time even after the tray 20 for a microwave oven has been discharged from the microwave oven, thereby being capable of delaying cooling of the food.

Hereinafter, a control method of the microwave oven to execute the above-described cooking will be described.

First, if one surface of food is grilled, a user puts the tray 20 for a microwave oven into the cooking chamber 10*a*, and then inputs a preheating command to the controller by operating a button provided on the microwave oven. The controller judges whether or not the preheating command is input (Operation 100), and operates the magnetron to preheat the tray 20 for a microwave oven (Operation 110). Here, preheating of the tray 20 for a microwave oven is executed for a first predetermined time set for preheating. The controller judges whether or not the first predetermined time has elapsed (Operation 120), and stops preheating of the tray 20 for a microwave oven to allow the user to place food to be cooked on the tray 20 for a microwave oven, upon judging that the first predetermined time has elapsed (Operation 130).

In the state that preheating of the tray 20 for a microwave oven is stopped, the user places the food on the tray 20 for a microwave oven, and then operates the button to input a cooking command to the controller. The controller judges whether or not the cooking command is input (Operation 140), and operates the magnetron to heat the tray 20 for a microwave oven and the food placed on the tray 20 for a microwave oven (Operation 150). Heating of the tray 20 for a microwave oven and the food placed thereon is executed for a second predetermined time set for cooking. The controller judges whether or not the second predetermined time has elapsed (Operation 160), and stops heating of the tray 20 for a microwave oven and the food placed thereon, upon judging that the second predetermined time has elapsed (Operation 170). Through such a process, the food, one surface of which has been grilled, is obtained.

Figure 6:
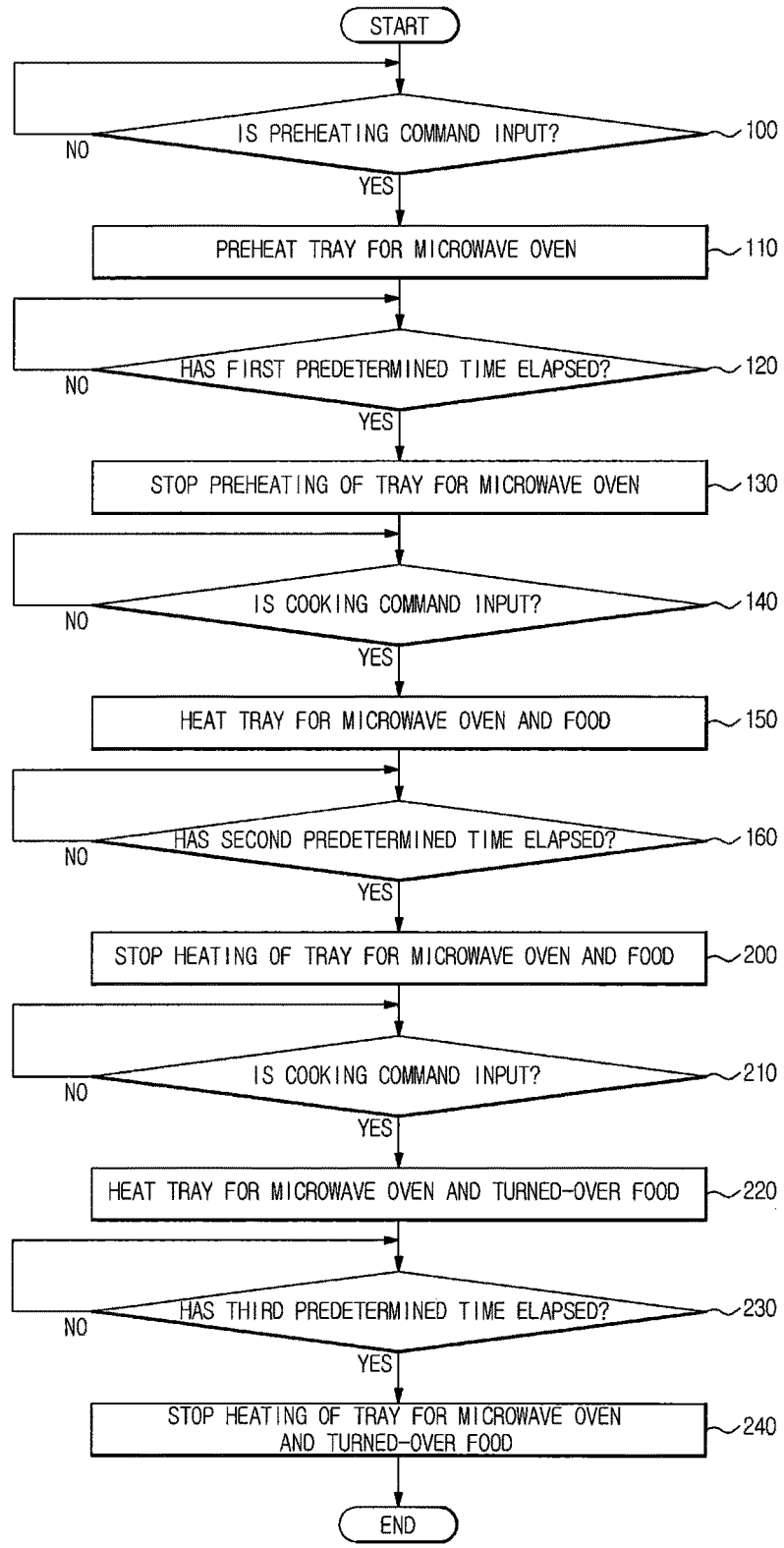
FIG. 6 is a flowchart illustrating a control method of a microwave oven in accordance with an embodiment.

Further, if both surfaces of food are grilled, as shown in FIG. 6, after the process to cook one surface of the food (Operations 100~160) has been executed, heating of the tray 20 for a microwave oven and the food placed thereon is stopped in order to turn the food over (Operation 200).

In the state in which heating is stopped (Operation 200), the user turns the food placed on the tray 20 for a microwave oven over, and then operates the button to again input a cooking command to the controller. The controller judges whether or not the cooking command is again input (Operation 210), and operates the magnetron to heat the tray 20 for a microwave oven and the turned-over food (Operation 220). Heating of the tray 20 for a microwave oven and the turned-over food is executed for a third predetermined time set for cooking. The controller judges whether or not the third predetermined time has elapsed (Operation 230), and stops heating of the tray 20 for a microwave oven and the turned-over food, upon judging that the third predetermined time has elapsed (Operation 240). Through such a process, the food, both surfaces of which have been grilled, is obtained.

By adjusting the above-described first, second and third predetermined times, food, such as a steak, may be differently cooked to a desired degree, such as rare, medium, well-done, etc.

Although this embodiment illustrates the controller as controlling a heating time through the magnetron to cook food, the controller is not limited thereto, but may independently or combinationally control output of the magnetron, a temperature of the food, etc., as well as the heating time so as to more precisely adjust the cooking states of the surface and the inside of the food.

Although this embodiment illustrates the tray unit 21 of the tray 20 for a microwave oven as being formed in a circular shape, the tray unit 21 is not limited thereto, but may be formed in other different shapes, such as a rectangular shape.

Although this embodiment illustrates the tray 20 for a microwave oven as including the tray grips 21C, the tray 20 for a microwave oven is not limited thereto, but may exclude elements corresponding to the tray grips 21C.

As is apparent from the above description, in a tray for a microwave oven in accordance with an embodiment, heat generators are formed on the tray for a microwave oven through transfer coating and thus distribution of the heat generators may be freely changed, thereby optimizing distribution of the heat generators according to distribution characteristics of high frequencies of a corresponding microwave oven so as to uniformly heat a tray unit.

Further, since the heat generators are formed on the tray unit through transfer coating carried out at a high temperature, the heat generators may heat the trays for a microwave oven at a higher temperature than conventional heating bodies formed of rubber ferrite, and may form a grill mark on food to be cooked.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A tray for a microwave oven comprising:
   a tray support formed of a metal wire;
   a tray unit to receive food; and
   heat generators formed of a material absorbing microwave energy to generate heat in the heat generators,
   the heat generators further comprising
      a first heat generating part of the heat generators, which is located in a first region, that is at a center of the tray unit, the heat generators of the first region comprising a center heat generator of the heat generators, which is in the first region, that is located in a center of the first region and the center heat generator being surrounded by other heat generators of the heat generators in the first heat generating part, and
      a second heat generating part of the heat generators, which is located in a second region, having a higher distribution of the heat generators than the heat generators of the first heat generating part, the heat generators in the second region being distributed at a location outside of the heat generators of the first region to maintain a lower temperature in the first region of the first heat generating part than in the second region of the second heat generating part,
   wherein a surface of the tray unit includes a plurality of raised grill markers configured to contact food placed on the surface of the tray unit and cause grill marks in a shape corresponding to the plurality of raised grill markers to be formed on the food that is placed on the tray unit when the tray unit is heated by the microwave oven, and
   wherein the tray unit is formed of ceramic.

2. The tray for the microwave oven according to claim 1, wherein:
   an upper surface of the tray unit includes a cooking unit provided to cook food; and
   the cooking unit includes at least one of a first cooking part concaved to execute frying, and a second cooking part provided with grill markers to execute grilling.

3. The tray for a microwave oven according to claim 2, wherein the upper surface of the tray unit further includes a fluid accommodation groove concaved at the edge of the cooking unit to accommodate a fluid.

4. The tray for the microwave oven according to claim 1, wherein tray unit includes another cooking surface, which is flat, in order to cook food not requiring the grill marks, the another cooking surface is on a same side of the tray unit as the plurality of grill marks and is also separate from the surface of the tray unit that is provided with the plurality of raised grill markers which are used to cook food requiring a grill mark.

5. A microwave oven comprising:
   a tray support formed of a metal wire;
   a main body provided with a cooking chamber; and
   a tray for the microwave oven inserted into the cooking chamber, wherein: wherein the tray for the microwave oven includes a tray unit to receive food and heat generators formed of a material absorbing microwave energy to generate heat in the heat generators,
   wherein the heat generators further comprise
   a first heat generating part of the heat generators, which is located in a first region, that is at a center of the tray unit, the heat generators of the first region comprising a center heat generator of the heat generators, which is in the first region, is located in a center of the first region and the center heat generator is surrounded by other heat generators of the heat generators in the first heat generating part, and
   a second heat generating part of the heat generators, which is located in a second region, having a higher distribution of the heat generators than the heat generators of the first heat generating part, the heat generators in the second region are distributed at a location outside of the heat generators of the first region to maintain a lower temperature in the first region of the first heat generating part than in the second region of the second heat generating part, and
   wherein a surface of the tray unit includes a plurality of raised grill markers configured to contact food placed on the surface of the tray unit and cause grill marks in a shape corresponding to the plurality of raised grill markers to be formed on the food that is placed on the tray unit when the tray unit is heated by the microwave oven, and
   wherein the tray unit is formed of ceramic.

6. The microwave oven according to claim 5, wherein the tray unit is formed of ceramic and the heat generators are formed of at least one of carbon and graphite.

7. The microwave oven according to claim 5, wherein:
   an upper surface of the tray unit includes a cooking unit provided to cook food; and
   the cooking unit includes at least one of a first cooking part concaved to execute frying, and a second cooking part provided with grill markers to execute grilling.

8. The microwave oven according to claim 7, wherein the upper surface of the tray unit further includes a fluid accommodation groove concaved at the edge of the cooking unit to accommodate a fluid.

9. The microwave oven according to claim 5, further comprising a tray support on which the tray for microwave oven is mounted, wherein the tray support includes:
   a support part to support the edge of the tray for the microwave oven;
   a plurality of legs extending downward from the support part; and a pair of support grips extending from the support part in the centrifugal direction.

10. The microwave oven according to claim 5, further comprising a tray cover for the microwave oven to cover the upper portion of the tray for the microwave oven.

* * * * *